(12) United States Patent
Yuan et al.

(10) Patent No.: US 9,127,860 B2
(45) Date of Patent: Sep. 8, 2015

(54) SOLAR ENERGY ABSORBER UNIT AND SOLAR ENERGY DEVICE CONTAINING SAME

(75) Inventors: Yudie Yuan, Kingston (CA); John Anthony Hunter, Kingston (CA)

(73) Assignee: Novelis Inc., Atlanta, GA (US)

( * ) Notice: Subject to any disclaimer, the term of this patent is extended or adjusted under 35 U.S.C. 154(b) by 722 days.

(21) Appl. No.: 13/328,394

(22) Filed: Dec. 16, 2011

(65) Prior Publication Data

US 2012/0160233 A1 Jun. 28, 2012

Related U.S. Application Data

(60) Provisional application No. 61/460,028, filed on Dec. 22, 2010.

(51) Int. Cl.
| | |
|---|---|
| *F24J 2/20* | (2006.01) |
| *F24J 2/48* | (2006.01) |
| *F24J 2/46* | (2006.01) |
| *F28F 19/06* | (2006.01) |
| *F28F 21/08* | (2006.01) |

(52) U.S. Cl.
CPC ............... *F24J 2/204* (2013.01); *F24J 2/4612* (2013.01); *F24J 2/485* (2013.01); *F28F 19/06* (2013.01); *F28F 21/084* (2013.01); *Y02B 10/20* (2013.01); *Y02E 10/44* (2013.01); *Y10T 29/49355* (2015.01)

(58) Field of Classification Search
CPC ............ F24J 2/204; F24J 2/205; F24J 2/208; F24J 2/22; F24J 2/4612; B32B 15/01; B32B 15/016
USPC ........ 126/651–677; 165/133, 134.1, 170, 905
See application file for complete search history.

(56) References Cited

U.S. PATENT DOCUMENTS

| 1,865,089 A | 6/1932 | Dix, Jr. et al. |
|---|---|---|
| 2,100,411 A | 11/1937 | Otto et al. |

(Continued)

FOREIGN PATENT DOCUMENTS

| CN | 1368627 A | 9/2002 |
|---|---|---|
| CN | 1995864 A | 7/2007 |

(Continued)

OTHER PUBLICATIONS

Canadian Intellectual Property Office, International Search Report, Feb. 7, 2012, PCT/CA2011/050713 (Novelis Inc. et al.).

(Continued)

*Primary Examiner* — Jorge Pereiro
(74) *Attorney, Agent, or Firm* — Kilpatrick Townsend & Stockton LLP (57) ABSTRACT

The invention relates to a solar energy absorber unit for a solar energy device, and methods of producing the same. The unit includes a collector plate having a front surface adapted to absorb solar energy and a rear surface. A rear panel has an inner surface attached to areas of the rear surface of the collector plate via a fluid-tight bond but leaving a fluid-conveying channel between the areas of the rear surface of the plate where the panel is attached. The collector plate and preferably the rear panel are each made of a core layer of an aluminum alloy provided with a cladding layer formed on a side of the core layer that confronts the fluid-conveying channel, the cladding layer being made of aluminum or an aluminum alloy having a total content of alloying elements and impurities, if any, of no more than 0.5 wt. %.

21 Claims, 7 Drawing Sheets

(56) References Cited

U.S. PATENT DOCUMENTS

| | | | | |
|---|---|---|---|---|
| 2,690,002 A | * | 9/1954 | Grenell | 29/890.042 |
| 2,726,436 A | * | 12/1955 | Champion | 428/654 |
| 2,821,014 A | * | 1/1958 | Miller | 428/654 |
| 3,136,037 A | * | 6/1964 | Solnick et al. | 29/890.042 |
| 3,168,381 A | * | 2/1965 | Finnegan et al. | 428/654 |
| 3,343,930 A | * | 9/1967 | Borzillo et al. | 428/653 |
| 4,062,350 A | | 12/1977 | Reed | |
| 4,178,990 A | | 12/1979 | Popplewell | |
| 4,182,399 A | * | 1/1980 | Popplewell | 165/133 |
| 4,238,233 A | * | 12/1980 | Yamada et al. | 420/541 |
| 4,279,243 A | | 7/1981 | Deakin | |
| 4,292,955 A | | 10/1981 | Smith | |
| 4,479,832 A | * | 10/1984 | Hart et al. | 148/273 |
| 4,632,885 A | * | 12/1986 | Tanabe et al. | 428/654 |
| 4,724,826 A | * | 2/1988 | Muramatsu | 126/636 |
| 5,041,343 A | * | 8/1991 | Fortin et al. | 428/654 |
| 6,050,330 A | * | 4/2000 | Schmit et al. | 165/133 |
| 7,226,669 B2 * | | 6/2007 | Benedictus et al. | 428/654 |
| 7,255,932 B1 * | | 8/2007 | Kilmer | 428/654 |
| 7,472,740 B2 | | 1/2009 | Anderson et al. | |
| 7,514,155 B2 * | | 4/2009 | Benedictus et al. | 428/654 |
| 7,516,637 B2 | | 4/2009 | Scamans et al. | |
| 7,767,042 B2 * | | 8/2010 | Hasegawa et al. | 148/437 |
| 8,216,693 B2 * | | 7/2012 | Matsukado et al. | 428/654 |
| 2002/0037426 A1 * | | 3/2002 | Yamada et al. | 428/654 |
| 2002/0073988 A1 | | 6/2002 | Reichert et al. | |
| 2007/0215312 A1 | | 9/2007 | Gallerneault | |
| 2007/0215313 A1 | | 9/2007 | Wagstaff | |
| 2008/0008903 A1 | | 1/2008 | Bull et al. | |
| 2008/0202720 A1 | | 8/2008 | Wagstaff | |
| 2009/0056904 A1 | | 3/2009 | Wagstaff et al. | |
| 2009/0162686 A1 * | | 6/2009 | Matsukado et al. | 428/576 |
| 2010/0032122 A1 | | 2/2010 | Gallerneault | |
| 2010/0124668 A1 | | 5/2010 | Gupta et al. | |
| 2010/0159266 A1 | | 6/2010 | Kang et al. | |
| 2010/0159272 A1 | | 6/2010 | Marois et al. | |
| 2010/0159275 A1 | | 6/2010 | Geho et al. | |

FOREIGN PATENT DOCUMENTS

| | | | |
|---|---|---|---|
| CN | 201803484 U | | 4/2011 |
| EM | 000838586-0001 | | 1/2008 |
| EM | 000838586-0002 | | 1/2008 |
| EM | 000838586-0003 | | 1/2008 |
| EP | 1 811 245 A2 | | 7/2007 |
| EP | 2262004 A1 | | 12/2010 |
| GB | 938012 A | * | 9/1963 |
| HU | 3315 U | | 7/2007 |
| HU | 229746 B1 | | 6/2014 |
| JP | 58-026966 A | | 2/1983 |
| JP | 59 142352 A | | 8/1984 |

OTHER PUBLICATIONS

Chinese Patent Application No. 201180068211.3, First Office Action mailed Jan. 7, 2015, 27 pages.

Solarkollektor—Péter Impex Ltd., Believed to be published at least as early as Dec. 25, 2008 at http://www.solarkollektor.hu/index_int.php?Main=downloads, 8 pages.

European Patent Application No. 11851764.8, Extended European Search Report mailed Oct. 28, 2014, 8 pages.

* cited by examiner

SOLAR ENERGY ABSORBER UNIT AND SOLAR ENERGY DEVICE CONTAINING SAME

CROSS-REFERENCE TO RELATED APPLICATIONS

This application claims the priority right of prior U.S. provisional patent application Ser. No. 61/460,028 filed Dec. 22, 2010 by applicants named herein. The entire contents of U.S. provisional patent application Ser. No. 61/460,028 are specifically incorporated herein by this reference.

BACKGROUND OF THE INVENTION (1) Field of the Invention

This invention relates to solar energy absorber devices. More particularly, the invention relates to solar energy absorber devices of a thermal rather than photovoltaic nature that employ solar energy collectors directly heated by sunlight and that, in turn, heat a fluid used to extract heat energy from the device.

(2) Description of the Related Art

Solar energy absorber devices of this kind are generally produced in the form of relatively thin panels that may be mounted on the roofs of buildings or in other convenient locations selected to receive direct sunlight during a substantial part of the day. The panels generally consist of a thin flat box having a transparent wall normally made of glass or a transparent plastics material with the remainder made of a metal, wood or plastics that is preferably insulated against heat loss. The box contains a solar energy collector in the form of a flat plate set back a few centimeters from the transparent wall and having a front surface colored black or coated with a special coating that absorbs incident sunlight and converts it to heat. The heat thereby generated is extracted from the rear surface of the collector plate via a metal tube (usually made of copper) arranged in a serpentine fashion through which a heat extraction fluid, normally an aqueous liquid, e.g. water or a mixture of water and propylene glycol (antifreeze), is caused to flow. Under normal conditions, the heat extraction fluid may reach temperatures as high as 100° C. due to the transfer of thermal energy from the collector plate to the metal tubes. The amount of energy captured depends on the size of the collector plate, the strength of the incident sunlight and the overall design of the device that may, if not planned carefully, lead to unwanted heat losses. Collector sizes are normally limited by handling and aesthetic considerations, particularly when the devices are intended to be roof-mounted and therefore highly visible. To minimize heat losses, such devices are generally thermally insulated, as mentioned above, and the box is normally closed and sealed to prevent convective heat loss and to protect the outer surface of the absorber from adverse effects of the weather. In use, therefore, still air provides a blanketing effect so that heat builds up within the box.

The collector plate itself must have good heat conductivity so that heat collected at the front surface readily passes through the panel to the rear surface where it is extracted. For this reason, it is normal for the panel to be made of a heat-conductive metal, e.g. aluminum, copper or alloys of these metals. The serpentine metal tube is generally directly attached to the rear surface of the collector plate and this may be done by various methods, e.g. physical forming, laser or ultrasonic welding, or soldering. In the case of laser welding (which produces good joints) a laser-weldable protective layer may be provided on the rear side of the plate. This offers protection for the plate and makes the welding process easier. However, discontinuous welds (i.e. so-called stitch welds) are often used for connecting the metal tube to the collector plate in order to reduce costs. The tube is therefore attached to the plate only at spaced intervals and the weld bead does not run along the entire length of the metal tube. This creates efficiency losses during the thermal energy transfer and, indeed, the use of welding for attachment of the tube is not highly energy efficient even when the welded bead does extend fully along the metal tube. Not only is the area of contact rather limited compared to the total surface area of the collector plate, but the material forming the weld may not have good thermal conductivity, and the heat has to pass through the wall of the metal tube before it heats the heat extraction fluid contained within.

Solar devices of this kind should be designed to be as maintenance-free as possible, and to have a long working life. The devices do not contain any moving parts that require routine maintenance, but corrosion may occur due to adverse effects of the heat extraction fluid. Unfortunately, materials that have good strength and properties that make them easy to fabricate into solar collectors or heat removal tubes often do not have good resistance to corrosion. To overcome this, attempts have been made to coat inner surfaces of the tubes or channels used for conveying the heat extraction fluids with corrosion-resistant materials, e.g. metal oxides, or to clad metal surfaces with layers of sacrificial alloys. Such approaches have been described, for example, in U.S. Pat. No. 4,178,990 which issued to James M. Popplewell on Dec. 18, 1979. However, coating with metal oxides was found to be unsatisfactory in completely precluding pitting corrosion, and the use of clad metals (e.g. aluminum clad with aluminum-zinc alloy) was found to be complex and costly due to the fact that two clad sheets must be bonded together. It was also found that protective claddings provided only limited protection since they were rapidly consumed by corrosion leaving an unprotected core surface, and corrosion occurred at the bonded portions, thereby resulting in penetration along the bonded interface and leakage of the heat transfer fluid. Popplewell preferred the provision of a getter substance having a high affinity for corrosive metal ions so that such ions would be removed from heat exchange fluid before such fluid passed through the solar collector apparatus.

In U.S. Pat. No. 4,062,350, which issued to Gerald C. Reed on Dec. 13, 1977, a solar absorber is described as having a base sheet made of stainless steel and an absorber sheet made of stainless steel having at least one surface coated with copper. The use of stainless steel can provide solar collector devices that are quite heavy. The patentee discourages the use of aluminum in such devices because aluminum is subject to corrosion when exposed to typical city water and is even more susceptible to corrosion when exposed to swimming pool water. Copper is employed because of its good thermal conductivity and corrosion resistance, but the patentee points out that the cost of copper is relatively high and it is a metal that might become scarce in the future.

U.S. Pat. No. 4,292,955 issued to Harold W. Smith on Oct. 6, 1981 discloses a solar energy collector in which the solar energy collector is said to be made of a metal having high corrosion resistance and heat transfer properties, for example copper.

European Patent Application EP 07100563.1, published as European patent publication no. EP 1811245 on Jul. 25, 2007, describes the construction of a solar collector from two sheets of aluminum. The first aluminum sheet is an absorber plate coated with a radiation absorbing coating. The second aluminum sheet, the lower sheet, comprises stampings which help form the channels through which the cooling fluid flows. The absorber plate and pre-stamped lower sheet are joined by soldering to form the closed channels. It is suggested that alloys of the Aluminum Association 3XXX series may be used, among others.

There is a need for an improved design for devices of this kind so that good efficiency of heat extraction may be obtained while minimizing corrosion of the materials of construction.

BRIEF SUMMARY OF THE EXEMPLARY EMBODIMENTS

An exemplary embodiment of the present invention provides a solar energy absorber unit. The unit includes a collector plate made of a heat-conductive material having a front surface adapted to absorb solar energy and to convert the solar energy to heat, and a rear surface opposite to the front surface, and a rear panel having an inner surface and an outer surface, the inner surface being attached to areas of the rear surface of the collector plate via a fluid-tight bond, whereby the inner surface of the panel and the rear surface of the collector plate together define at least one fluid-conveying channel between (i.e. within the bounds of) the areas of the rear surface of the plate where the panel is attached thereto. The unit also includes connectors for introducing a heat extraction fluid into the at least one channel and for removing the fluid therefrom. The collector plate comprises a core layer of an aluminum alloy provided with a cladding layer forming the rear surface of the plate, the cladding layer being made of aluminum or an aluminum alloy having a total content of alloying elements and impurities, if any, of no more than 0.5 wt. %, preferably no more than 0.4 w. %, and more preferably no more than 0.35 wt. %. Even more preferably the total Fe content, if any, is no more than 0.25 wt. % (i.e. 0-0.25 wt. %). The alloy of the cladding layer is therefore highly pure and comprises mainly aluminum.

The rear panel may be made of metal, or alternatively of a material such as plastics or composites, in which case the inner surface of the rear panel may be shaped to form concavities in regions corresponding to the fluid-conveying channel either before or after the rear panel has been attached to the collector plate. The rear panel of plastics or composite material may be attached to the collector plate by the use of an adhesive. However, the rear panel is preferably a metal panel having a core layer of an aluminum alloy provided with a cladding layer forming the inner surface of the panel, the cladding layer being made of aluminum or an aluminum alloy having a total content of alloying elements and impurities, if any, of no more than 0.5 wt. %, preferably no more than 0.4 w. %, and more preferably no more than 0.35 wt. %. Even more preferably the total content of Fe, if any, is no more than 0.25 wt. %.

When the panel is a metal panel as indicated above, the fluid-tight bond is preferably one formed by roll bonding together the cladding layers of the collector plate and the rear panel in the areas of the plate to be joined. The fluid-conveying channels may then be formed by inflating unbounded or weakly bonded areas between the plate and the panel by introducing a fluid under pressure. The roll-bonding results in direct contact between the metal collector plate and the metal rear plate that allows good heat transfer between the two. When the rear panel is made of plastics or composite material, the fluid-tight bond may be formed by application of an adhesive in the areas to be joined and the fluid-conveying channel may be formed by previously-shaped regions of the rear panel.

The collector plate may have a further cladding layer on the opposite side of the core layer forming the front surface of the plate, the further cladding layer being made of aluminum or an aluminum alloy having a total content of alloying elements and impurities, if any, of no more than 0.5 wt. %, preferably no more than 0.4 w. %, and more preferably no more than 0.35 wt. %. Likewise, the rear panel preferably includes a further cladding layer on the opposite side of the core layer of the panel forming the outer surface, the further cladding layer being made of aluminum or an aluminum alloy having a total content of alloying elements and impurities, if any, of no more than 0.5 wt. %, preferably no more than 0.4 w. %, and more preferably no more than 0.35 wt. %.

The front surface of the collector plate is advantageously provided with a roughened or textured surface adapted to enhance the absorption of the solar energy. Alternatively, or additionally, the front surface may be provided with a layer of material adapted to enhance the absorption of the solar energy.

Another exemplary embodiment provides a solar energy absorber device, including an enclosure having a front wall made of transparent material, e.g. glass or plastics, and a solar energy absorber unit of the above kind mounted within the enclosure.

A further exemplary embodiment provides a method of producing a solar energy absorber unit. The method involves providing a collector plate made of a heat-conductive material having a front surface adapted to absorb solar energy and to convert the solar energy to heat, and a rear surface opposite to the front surface, and a rear panel having an inner surface and an outer surface. Parts of the inner surface of the rear panel or the rear surface of the collector plate are coated with a dis-bonding ink in the pattern of the fluid-conveying channel, and uncoated areas of the inner surface of the panel are attached to corresponding areas of the rear surface of the plate by roll bonding to form a fluid-tight bond there-between, while leaving unbounded or weakly-bonded regions in the indicated pattern. The fluid conveying channel is then inflated with a fluid under pressure introduced between the plate and the panel in the unbounded regions. Connectors are provided for the fluid-conveying channel to enable a heat extraction fluid to be introduced into the channel and removed therefrom.

In this description, reference is made to alloys identified by AA numbers. For an understanding of the number designation system most commonly used in naming and identifying aluminum and its alloys see "International Alloy Designations and Chemical Composition Limits for Wrought Aluminum and Wrought Aluminum Alloys", published by The Aluminum Association, revised February 2009 (the disclosure of which is incorporated herein by reference).

It should be explained that the terms "clad" and "core", or "cladding layer" and "core layer", are used herein quite loosely. For example, while a core layer and a cladding layer may be easy to identify in a three-layer structure, there may strictly speaking be no core layer (i.e. an embedded layer) as such in a two-layer structure. However, the core layer is normally considered to be the thicker layer in such a two-layer structure, and it is usually the layer that imparts the bulk physical properties to the layered structure. In the context of the present invention, a layer of a multi-layer structure which confronts the at least one fluid conveying channel is considered to be a cladding layer (or clad).

The highly pure aluminum alloys used for the cladding layer(s) of the collector plate and optionally the rear panel have good corrosion resistance, as shown in the EXPERIMENTAL section below, but they tend to be too weak and prone to damage for use in the form of a monolithic layer (single layer). It is has been found advantageous to provide such alloys as cladding layers on surfaces susceptible to corrosion on a stronger metal core. The cladding layers are preferably provided on the surfaces that are susceptible to corrosion, i.e. the surfaces within the fluid-conveying channel (s) and possibly the surfaces that come into contact with the atmosphere within the enclosure provided for solar heat absorber units.

DETAILED DESCRIPTION OF THE EXEMPLARY EMBODIMENTS

Figure 1:
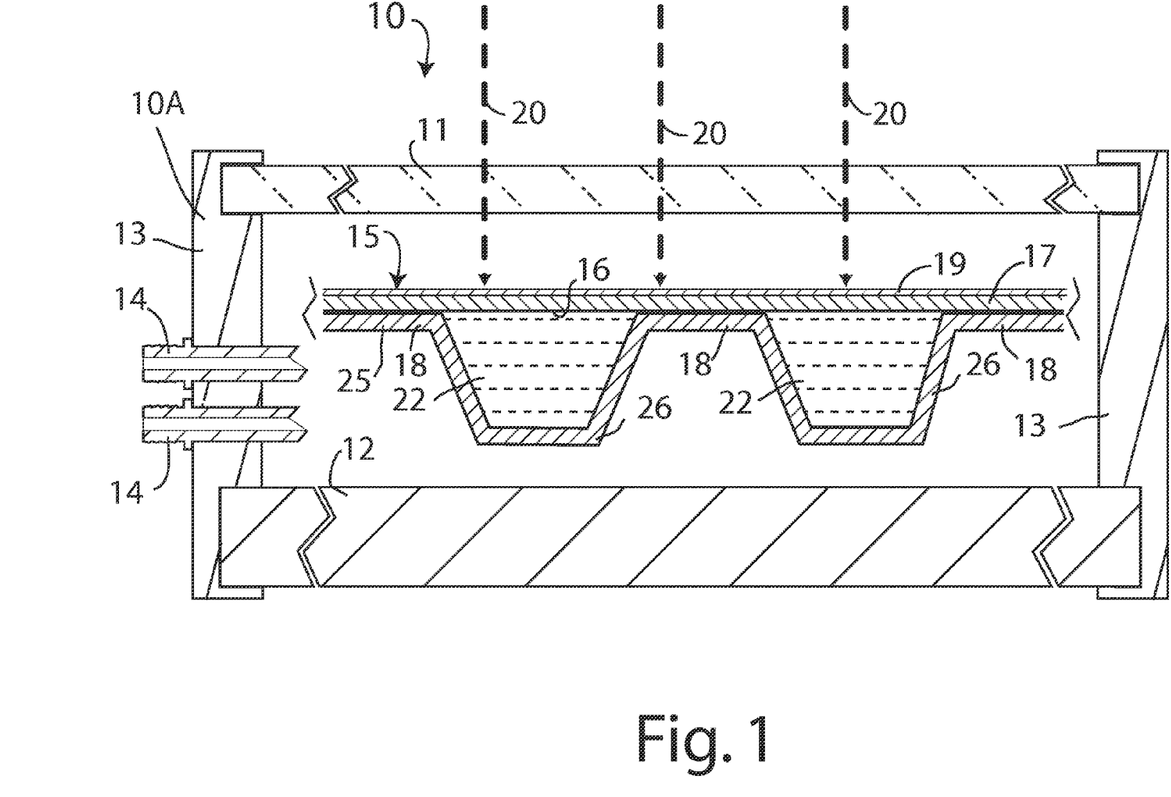
FIG. 1 is a cross-section of one exemplary embodiment of a solar energy absorber device.

An exemplary embodiment of a solar energy absorber device of a kind to which the present invention relates is shown in FIG. 1 of the accompanying drawings and is briefly described below.

The figure shows a partial cross-section of a solar energy absorber device 10 in the form of a flat panel suitable for mounting on the roof of a building, or the like. The device includes an outer enclosure 10A having a transparent rectangular front wall 11 made, for example, of glass or clear plastics, and rear wall 12 made, for example, of an insulating material (e.g. expanded polystyrene) or of metal, wood or plastics provided with an inner and/or outer layer of a conventional thermal insulator (not shown), e.g. glass fiber or the like. The front and rear walls are connected at their peripheries by short side walls 13 that may be made of the same construction as the rear wall 11. The walls are interconnected at their respective edges to form a sealed device. Fluid connectors 14, that allow heat extraction fluid to enter and leave the device, pass through one of the walls, e.g. a side wall 13 as shown. The sealed enclosure 10A contains a solar energy absorber unit 15 that absorbs solar energy 20 passing through transparent wall 11, converts it to heat energy, and then collects and removes the heat energy by utilization of a heat extraction fluid. The unit 15 includes a collector plate 17 having a front surface painted black or provided with a layer 19 of a material that efficiently absorbs solar energy and is thereby heated. The heat is transferred through the collector plate 17 by conduction to its rear surface 16 which is covered over its entire surface area, or a selected part or parts thereof, with a rear panel 25. The rear panel is contoured to provide planar parts 18 that contact the collector plate 17 and a single channel 26 following a serpentine or other complex path, or alternatively multiple channels as will be described later. The channel 26 is connected via suitable piping (not shown) at its opposite ends to the fluid connectors 14 so that it may be continuously supplied with a heat extraction fluid 22 (which is normally water or water containing propylene glycol or a similar chemical as an anti-freeze/anti-boiling additive) by means of a fluid pump (not shown) positioned outside the device 10. It will be noted that the heat extraction fluid 22 within the channel is in direct contact with the rear surface 16 of the collector plate 17 over a considerable area of the rear surface 16, which allows more efficient heat collection than the conventional serpentine metal tube normally provided for this purpose. The heat generated by the solar energy is collected by the heat extraction fluid 22 and is removed from the device with the heat extraction fluid. The heated fluid removed in this way may be used, e.g. by conventional heat exchange, to heat another medium (e.g. hot water for use within a building, or air or water for heating a building space directly, or for other processes). The heat extraction fluid of reduced temperature is then returned to the solar energy absorber device 10 for further heat collection and a constant and continuous recirculation of the heat extraction fluid is normally carried out.

Figure 2:
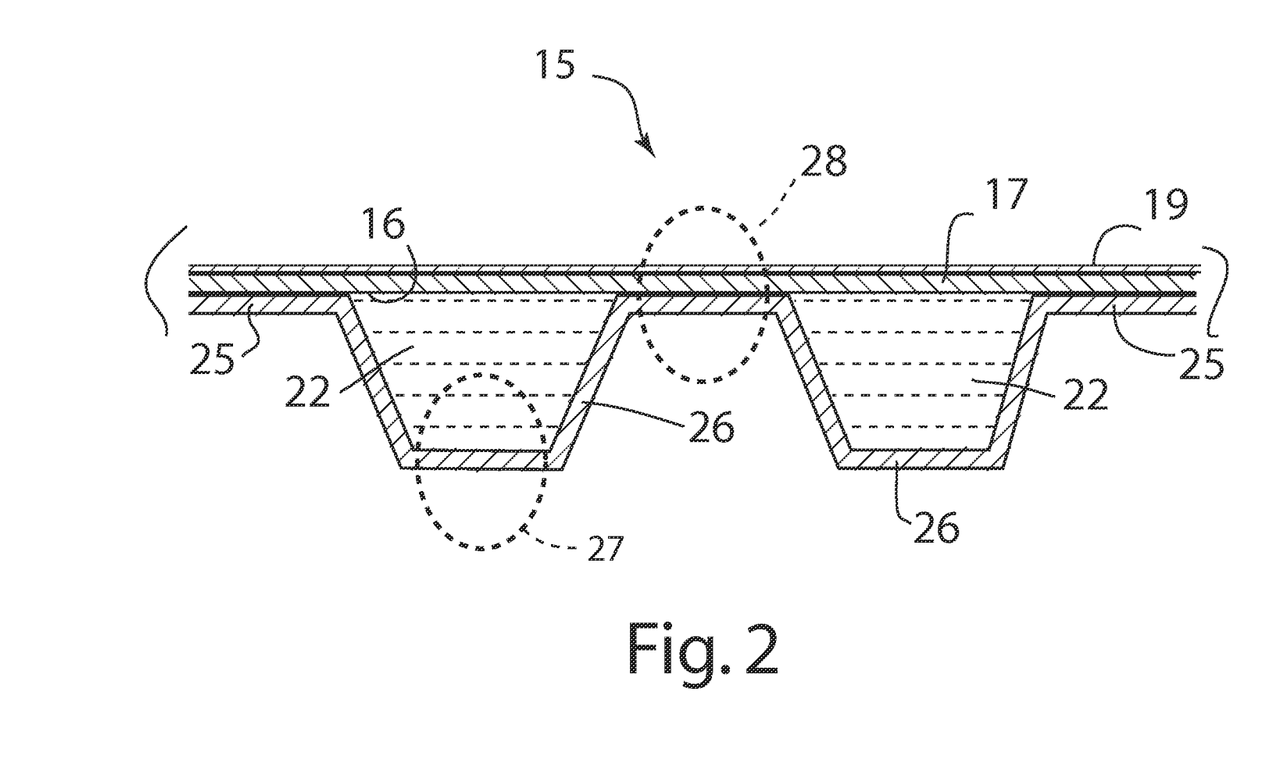
FIG. 2 is a partial cross-section of the solar energy absorber unit of the device of FIG. 1.

FIG. 2 is a cross-section similar to FIG. 1 but showing only the solar energy absorber unit 15 alone. The rear panel 25 is securely attached to the rear surface 16 of the collector plate 17 in regions such as 28 and this attachment is made over the entire extent of the panel 25 to confine the heat extraction fluid within the channel 26 and to avoid cross-flow of heat extraction fluid between adjacent loops of the channel. The collector plate 17 is preferably made of aluminum alloy sheet clad on one or both sides with a thin layer of a different aluminum alloy. Clad sheet of this kind can be made, for example, by hot and cold rolling composite ingot produced by the sequential co-casting method disclosed in U.S. Pat. No. 7,472,740 to Anderson et al., issued Jan. 6, 2009 (the disclosure of which is specifically incorporated herein by reference). The rear panel 25 may be made from metal or alternatively a molded plastics material or composites, in which case the bonding in regions 28 is achieved by the use of an adhesive.

Figure 3A:
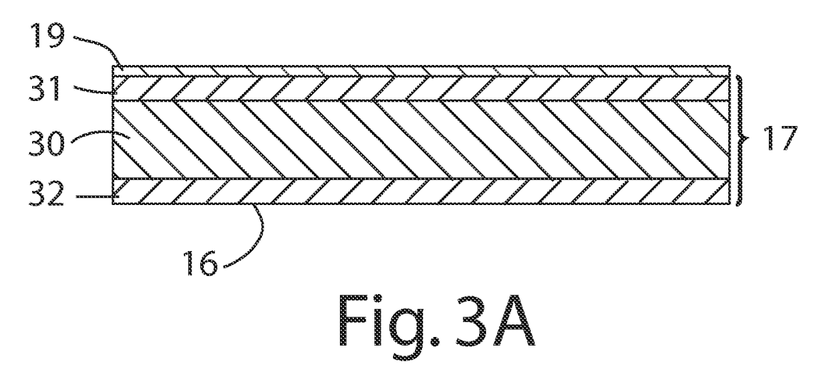
FIGS. 3A, 3B and 3C are partial cross-sections of exemplary collector plates that may be used in the unit of FIG. 2.

FIG. 3A shows an exemplary embodiment of a collector plate 17 in the form of a clad plate consisting of a core layer 30 and cladding layers 31 and 32 provided on opposite sides of the core layer. The core layer 30 is an alloy chosen for its good mechanical properties as well as good thermal conductivity. Preferably, the alloy of the core is not a heat-treatable (age hardening) alloy, so that there is no need for a heat treatment to develop the mechanical strength of the alloy of the core layer. Such heat treatments may undesirably cause the migration of alloying elements from the core layer 30 to the cladding layers 31 and 32, thereby harming the corrosion performance of the cladding layers. Aluminum alloys of the AA3XXX, AA4XXX, AA5XXX or AA8XXX series are suitable for the core layer, and so too are some of the alloys of the AA1XXX series. The alloy choice for the core layer 30 may also be influenced by ease of co-casting by the process mentioned above. The cladding layers 31 and 32 are selected to be alloys that have high resistance to corrosion. Corrosion is most likely to occur at the points where the collector plate 17 contacts the heat extraction fluid 22, so the plate may be clad on only one side, i.e. the side forming the rear surface 16 that confronts and contacts the heat extraction fluid 22 within the channel 26. The preferred alloys chosen for the cladding are aluminum alloys having a total content of alloying elements and impurities, if any, of no more than 0.5 wt. %, more preferably no more than 0.4 wt. % and most preferably no more than 0.35 wt. %. Thus, the aluminum alloys are highly pure.

Prolonged periods of high temperature heat treatment may be used to help solutionize impurity elements like Fe. In principle this could prevent the impurities from acting as cathodes, thereby improving corrosion resistance further for a given impurity base level. In practice, this is less preferred as it is slow and expensive and is likely to soften and distort the panels.

As noted, the upper (i.e. outer) surface of the collector plate 17 is normally coated with a layer 19 of material that strongly absorbs solar energy. The layer 19 is preferably highly adherent and resistant to atmospheric forms of corrosion over many years of service. The optional use of a further cladding layer 31 of highly corrosion resistant metal beneath layer 19 also enhances the corrosion-resistance properties and the general weatherability of the panel. This layer 31 may be made of the same alloy as that of the lower cladding layer 32, or it may be different because it is primarily intended to reduce corrosion when in contact with air or other gases or moisture present in the enclosure 10A, rather than the heat extraction fluid.

Figure 3B:
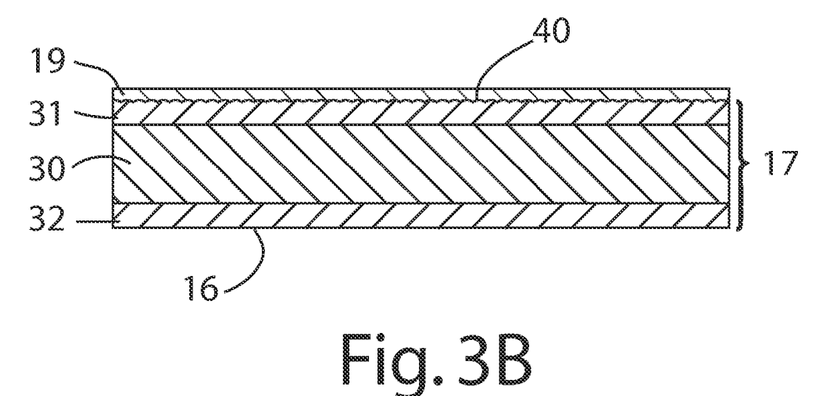
Figure 3C:
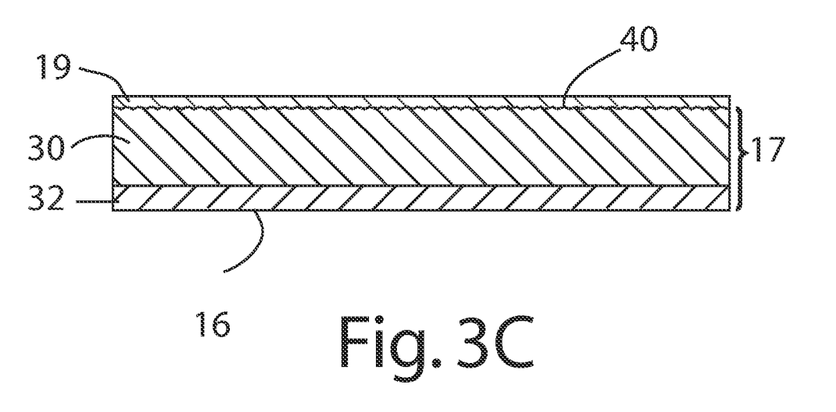

As shown in FIG. 3B, the upper surface of the collector plate 17 may additionally be provided with a roughened or textured surface 40 to improve solar absorption. The upper surface can be textured in accordance with the teaching of U.S. Pat. No. 7,516,637, the disclosure of which is hereby incorporated by reference. In the case of a core layer 30 provided with clad layers on both sides, as shown in FIG. 3B, the roughened or textured surface 40 would be the upper surface of cladding layer 31 in contact with coating layer 19. However, the cladding layer 31 may be omitted as shown in the alternative embodiment of FIG. 3C (e.g. if atmospheric corrosion is not a serious concern). In this case, the roughened or textured surface 40 is the upper surface of the core layer 30 in contact with the coating layer 19.

Figure 4:
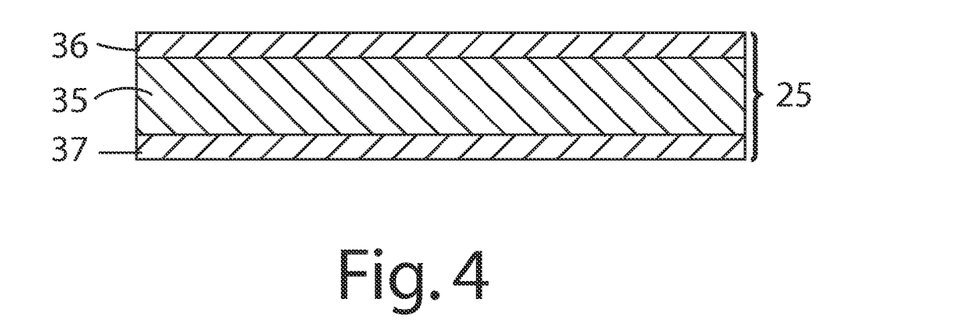
FIG. 4 is a partial cross-section of a rear panel that may be used in the unit of FIG. 2.

While the rear panel 25 may be made of plastics or composite material as previously mentioned, it is preferably made of aluminum or an aluminum alloy preferably clad on one or both sides with a different aluminum alloy in the same manner as the collector plate 17. Such an arrangement is shown in FIG. 4 (which shows part of the panel in the area indicated by reference numeral 27 in FIG. 2) where a core layer 35 is clad on its opposite sides with cladding layers 36 and 37. Again, the core 35 may be chosen from alloys having good mechanical properties. Ideally, heat-treatable alloys are avoided for the core layer 35 so that there is no need for a heat treatment to develop mechanical strength. Such heat treatments are undesirable because they may cause migration of alloying elements from the core layer 35 to the cladding layers 36 and 37, thereby reducing their corrosion resistance. Suitable alloys for the core layer 35 include alloys from the AA3XXX and AA5XXX series. The upper surface of the rear panel that forms the inner surface of the heat extraction channel 26 is clad with aluminum or an aluminum alloy having a total content of alloying elements and impurities, if any, of no more than 0.5 wt. %, more preferably no more than 0.4 wt. % and most preferably no more than 0.35 wt. %. These alloys are consequently highly pure. In combination with the cladding layer 32 provided on the fluid-confronting surface of the collector plate 17, this ensures that the heat extraction fluid 22 is entirely enclosed within corrosion resistant surfaces forming the channel 26. The cladding used for the lower (i.e. outer) layer 37 of the rear panel (if any) may also be of a highly corrosion resistant aluminum alloy that resists corrosion from the atmosphere within the solar device. This may be the same as the alloy of cladding layer 36 or a different corrosion-resistant alloy. Clad panels of this kind may be made from clad ingot produced by the process as mentioned above.

Figure 5A:
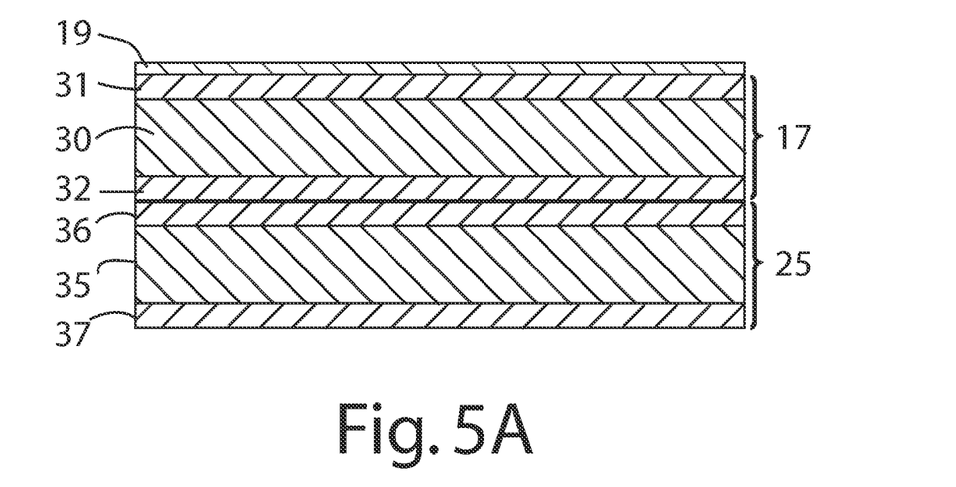
FIGS. 5A and 5B are alternative partial cross-sections of exemplary assemblies of collector plates and rear panels at points of mutual attachment, these being of a kind that may be employed in the unit of FIG. 2.

FIG. 5A shows a clad collector plate 17 and a clad rear panel 25 in the region of FIG. 2 indicated by reference numeral 28 where the collector plate and rear panel contact each other and are mutually attached. The inner cladding layer 32 of the collector plate 17 and the inner cladding layer 36 of the rear panel 25 are, as indicated above, chosen to provide high corrosion resistance to the heat extraction fluid 22. Also, the use of high purity alloys for these cladding layers makes it possible to minimize micro-galvanic activity, thereby further reducing or delaying corrosion.

Figure 5B:
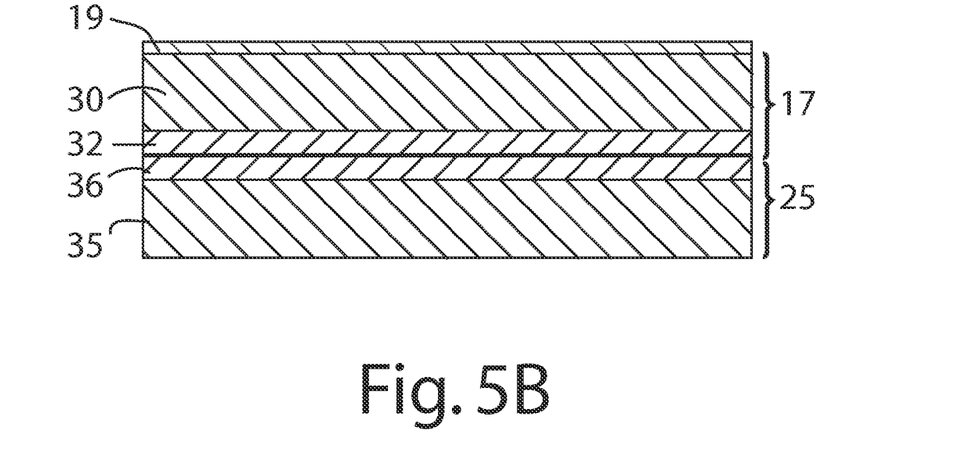

FIG. 5B shows a clad collector plate 17 and a clad rear panel 25 where the collector plate and the rear panel comprise just one cladding layer each. The cladding layer 32 of the collector plate 17 and the inner cladding layer 36 of the rear panel 25 are, as indicated above, chosen to provide high corrosion resistance to the heat extraction fluid 22, but the previously-described outer cladding layers 31 and 37 are not present. Such an arrangement would be used in situations where atmospheric corrosion is not a significant concern. As previously mentioned the outer surface of core layer 30 in the embodiment of FIG. 5B, or the outer surface of cladding layer 31 in the embodiment of FIG. 5A, may be textured or roughened to improve or enhance solar absorption.

The high purity alloys used for the cladding layers facilitate a roll bonding process that may be used to attach the rear panel 25 to the collector plate 17. Roll bonding involves applying a significant force to the plate and panel by passing the stacked plate and panel between force-loaded rollers in the regions where the plate and panel are to be joined. This would be difficult if the rear panel 25 where shaped in advance to form the channels 26. Accordingly, the rear panel 25 may be kept flat and an inner surface of either the plate or the panel may be "printed" with a dispersion of dis-bonding material (often referred to as a dis-bonding "ink") to create the desired path of the channel 26. Graphitic inks are suitable for this purpose. The collector plate and rear panel are then passed through force-loaded rollers so that roll bonding takes place. In the contacting regions that are not separated by the dis-bonding ink, the strength of the bond is relatively high, while in the contacting regions where the dis-bonding ink is deposited, the bond strength is relatively low or the surfaces are not bonded at all. The regions with low or zero bond strength after roll bonding can then be "inflated" to form the channel 26, i.e. an inflating fluid under pressure is introduced between the collector plate and the rear panel, and the pressure is made high enough to force the collector plate and rear panel apart in the areas where they are not strongly attached, and high enough to permanently distort the panel to form the channel 26. The inflating fluid may be a gas or a liquid.

During the inflation, only one of the collector plate and the rear panel may be distorted (preferably the rear panel), or both may be distorted as the channel 26 is formed. Inflation of both the collector plate and rear panel has the advantage of maximizing the cross-sectional area of the channel formed while limiting the stretch-forming requirements of either one. If only one of the collector plate and rear panel is to be inflated, that component will have to provide all the stretch forming. The amount of relative inflation within the collector plate and rear panel will be influenced by the relative strengths and/or thicknesses of the alloys used for core layers 30 and 35. For a core that is to be distorted, it is preferable to use an alloy that has a yield strength in the O-temper of no more than about 60 MPa and an elongation (uniaxial elongation to failure) of 30% or more. Also, the difference in yield strength of the metal used for the cladding and the core should preferably be no more than about 50 MPa. The elongation of the cladding should preferably be the same as, or higher than, that of the core because the elongation of the core dominates as the inflation takes place. To provide specific preferred examples, it is mentioned that the yield strength of the alloy AA1100 in the O temper, often used for the core, is 34 MPa and its elongation is about 35%. For alloy AA3003 in the O temper, the corresponding values are 42 MPa and 30-40%, and alloy AA5005 has an O temper yield strength of 40+MPa. In contrast, alloys AA5082 and AA5083 have yield strengths of 100-200 MPa, which are too high for use in core layers intended to undergo distortion during channel inflation.

Preferred exemplary embodiments of the invention will be understood further by reference to the following EXPERIMENTAL section.

EXPERIMENTAL

Tests were carried out to determine the kinds of aluminum alloys that would form effective cladding layers to minimize corrosion within the channels of solar energy absorber units. Table 1 below shows the compositions of eight candidate alloys.

TABLE 1

Aluminum Alloys Evaluated as Clad Layers
Amounts are in weight percent of the total alloy

| Sample No. | Cu | Fe | Mg | Mn | Si | Ti | Zn | V | Total |
|---|---|---|---|---|---|---|---|---|---|
| 1 | 0.004 | <0.001 | 0.003 | <0.001 | 0.005 | <0.001 | <0.001 | <0.001 | 0.017 |
| 2 | 0.004 | 0.078 | <0.001 | 0.001 | 0.046 | 0.005 | 0.002 | 0.008 | 0.145 |
| 3 | 0.004 | 0.129 | <0.001 | 0.001 | 0.045 | 0.005 | 0.002 | 0.008 | 0.195 |
| 4 | 0.004 | 0.165 | <0.001 | 0.002 | 0.045 | 0.005 | 0.002 | 0.008 | 0.232 |
| 5 | <0.001 | 0.218 | <0.001 | <0.001 | 0.069 | 0.003 | 0.015 | <0.001 | 0.309 |
| 6 | <0.001 | 0.35 | 0.002 | 0.004 | 0.046 | 0.007 | 0.012 | 0.005 | 0.427 |
| 7 | 0.14 | 0.32 | 0.005 | 0.003 | 0.099 | 0.011 | 0.004 | 0.007 | 0.589 |
| 8 | 0.16 | 0.59 | 0.039 | 1.087 | 0.2 | 0.007 | 0.009 | 0.012 | 2.104 |

Note:
All other elements and impurities were present in amounts of less than 0.005 wt. % each.

In the discussion of the embodiments above, it has been stated that the channel 26 may be a single channel extending over the rear surface of the collector plate 17 in a serpentine or other complex pattern. However, alternative arrangements are possible. For example, individual channels may extend in parallel across the rear surface of the plate 17 and be joined either outside the device or via manifolds extending along opposite side edges of the collector plate. In addition, the method of attachment described above may if desired be used to produce channels with variable cross sections along the channel length. The method may also be used to vary the areas of attachment, such that the contact area of the heat extraction fluid with the lower surface of the collector plate can be varied along the channel length. The ability to vary the nature of the channels in this way is useful to accommodate variations in heat extraction fluid flow rate or pressure that might otherwise occur with given channel patterns. Moreover, it has been stated that the collector plate 17 is generally flat (which is preferred), but alternatively, the channels 26 may be formed in the collector plate 17 with the rear panel either being flat, or partly contoured to form part of the channels together with the contoured collector plate 17.

There are numerous options for the material used for the optional solar absorber layer 19. The layer is usually a thin black film formulated to have high absorptivity and low emissivity (e.g. a selectivity as high as 95:5 for absorptivity:emissivity). Thin films of "intrinsic absorbers" such as cobalt oxide, or copper oxide may be employed. However, high selectivity can be induced in other ways, such as using alternating layers of dielectric and thin metals films (optically transparent) or semi-conductor/metal combinations. Multilayered structures are generally high performance, but may be more expensive to produce.

The solar energy absorber units of the exemplary embodiments may be made in any desired size. A conventional size for such units is 1.2 m by 2.4 m (4 ft by 8 ft), but smaller units may also be desirable, e.g. 1 m by 2 m.

Sample alloy 8 is a typical 3XXX series alloy having Mn as the main alloying element.

All of the alloys were evaluated in monolithic (single layer) sheet form of approximately 0.9~1.0 mm gauge. An initial series of tests was conducted on mill-finish surfaces following ultrasonic degreasing in ethanol for approximately 2 minutes.

Figure 6:
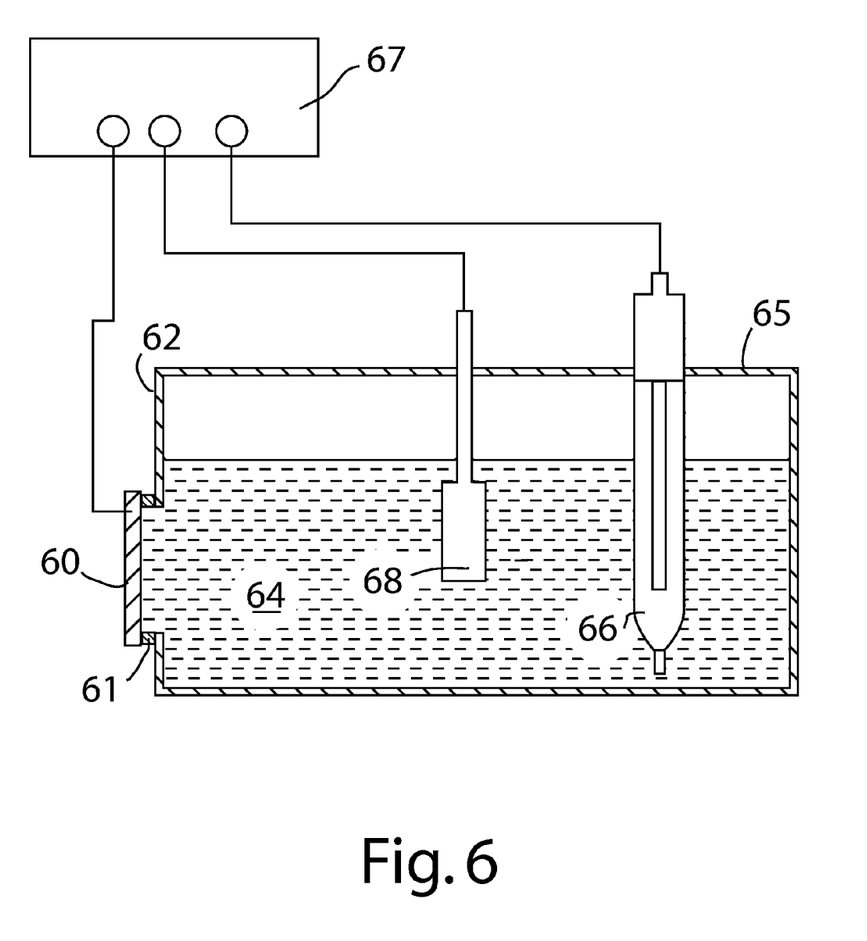
FIG. 6 is a cross-section of an experimental cell used for generating results as described in the EXPERIMENTAL section below.

Electrochemical experiments were conducted using a Princeton "flat cell" having a standard three-electrode arrangement as shown in FIG. 6. This apparatus allowed the testing of small coupons 60 of aluminum alloy with a minimum of specimen preparation. The front faces of the test coupons 60 were clamped against an O-ring seal 61 mounted in an end plate 62 of the cell 65. This arrangement exposed a uniform 1 cm$^2$ disc of the metal coupon to a test solution 64 within the cell. Linear Polarization Experiments (LPE) were conducted using a programmable electrochemical interface obtained from ACM Instruments Ltd. of Cumbria, United Kingdom.

The LPE experiments involved measuring the potential between the test coupon 60 and a standard reference electrode 66 (e.g. Calomel, referred to as SEC, or Ag/AgCl) and controlling the potential using a potentiostat 67. By forcing the aluminum of the coupon to polarize anodically, it was possible to provide a progressively increasing driving force for passive film breakdown and consequent pit initiation. The extent of passive film resistance during this polarization was measured by monitoring the current between the sample coupon 60 and an inert counter electrode 68 as the potential of the aluminum sample was progressively increased (i.e. made more positive). A typical LPE result for aluminum alloy shows three features which are representative of the corrosion resistance of the alloy in the particular test solution, i.e.:
 1. Efc—the free corrosion potential of the alloy;
 2. Epit—the breakdown potential, sometimes referred to as the pitting potential; and
 3. A passivation range—a measure of the potential difference between Efc and Epit. This range is commonly used as a measure of the pitting resistance of an alloy.

The alloys of Table 1 were tested in LPE experiments using various test aqueous solutions. The heat extraction solutions commonly used for heat extraction in solar thermal devices (i.e. 50% water/50% propylene glycol) usually have very low ionic conductivity and none of the alloys exhibited breakdown potentials (Epit) over the short periods involved in LPE experiments using such solutions and therefore such solutions were not useful for ranking the corrosion resistance of candidate alloys. For this reason, more aggressive test solutions were used, i.e.:

ASTM water at 25° C. (148 mg/L $Na_2SO_4$; 165 mg/L $NaHCO_3$)

50% water+50% propylene glycol+250 ppm chloride

Figure 7:
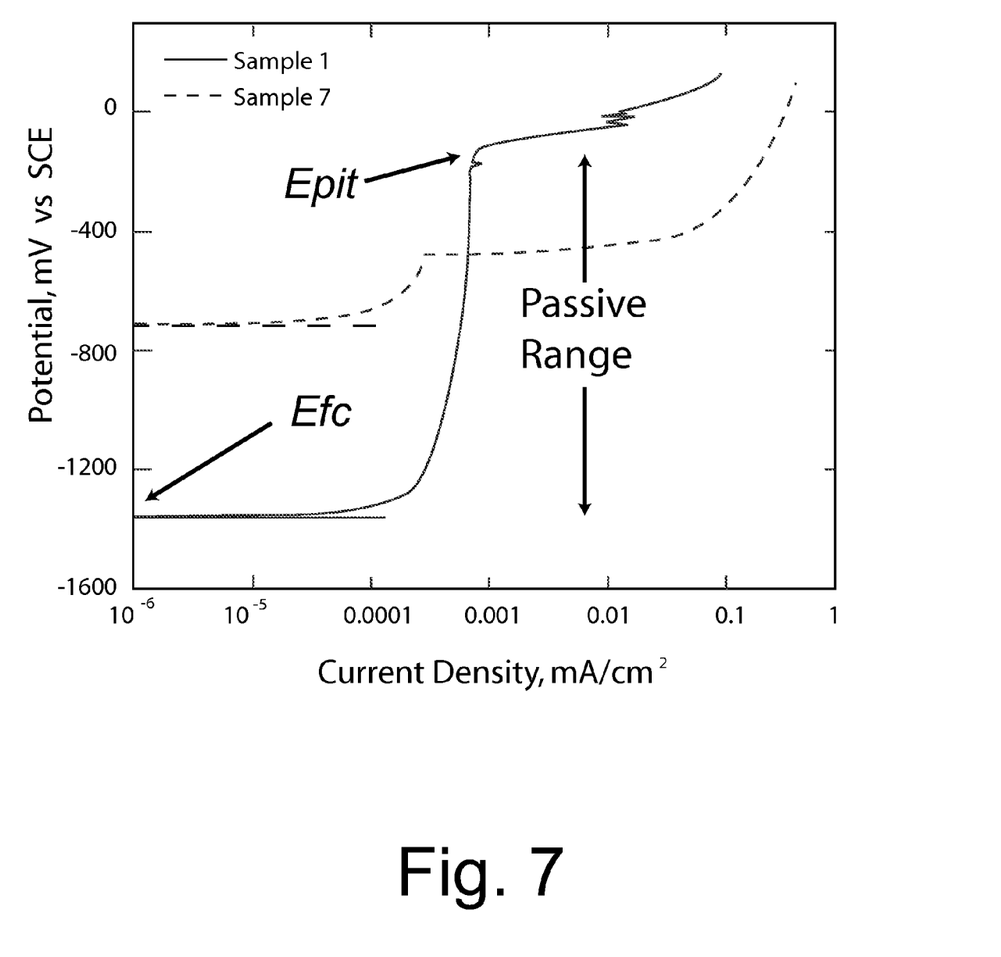
FIG. 7 is a graph showing the results of an experiment described in the EXPERIMENTAL section below.

The results of LPE experiments carried out on alloy Samples 1 and 7 (of Table 1) in ASTM water at 25° are shown in FIG. 7. The results show a significantly higher passive range for Sample 1 (1254 mV) than for Sample 7 (~234 mV). These data are believed by the inventors to be due to the much higher levels of impurities, such as iron and silicon, present in the alloy of Sample 7. The impurities are believed to act as cathodes on exposed surfaces, thereby promoting micro-galvanic activity and reduced passivity. Hence, these results predict a much greater resistance to pitting corrosion for the alloy of Sample 1 than the alloy of Sample 7.

Data for similar tests carried out on all of the alloy Samples of Table 1, again using ASTM water at 25° C., are shown in Table 2 below. The Table shows the free corrosion (Efc) values, the breakdown potentials (Epit) and the passive ranges for the alloy Samples.

TABLE 2

| Sample No. | Efc mV vs SCE | Epit mV vs SCE | Passive Range mV vs SCE |
|---|---|---|---|
| 1 | −1396 | −142 | 1254 |
| 2 | −950 | −251 | 698 |
| 3 | −697 | −251 | 447 |
| 4 | −720 | −284 | 436 |
| 5 | −827 | −251 | 575 |
| 6 | −984 | −610 | 374 |
| 7 | −749 | −515 | 234 |
| 8 | −792 | −580 | 213 |

The data summarized in Table 2 provides an indication of the pitting resistance of the range of candidate alloys of Table 1. It can be seen from these data that standard alloys typically used for fabricating heat extraction units because of their good strength, i.e. Sample 7 (an AA1100 alloy) and Sample 8 (an AA3003 alloy), exhibit significantly lower passive ranges than more pure alloys (Samples 1 through 6). It can therefore be assumed that the level of passivity exhibited for Samples 7 and 8 in these short term LPE experiments makes these alloys inadequate for long term service.

Figure 8:
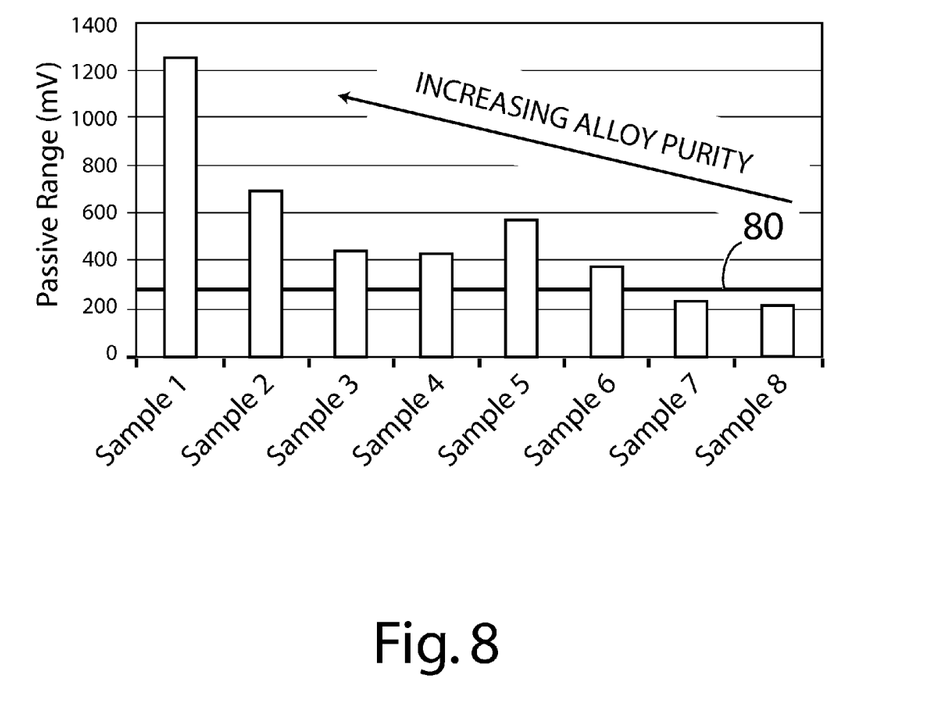
FIG. 8 is a graph showing the measured passive ranges of the various alloys shown in Table 1 below.

FIG. 8 shows in chart form the passive ranges from Table 2 for the various Samples. It can be seen from this figure that there is a general correlation between alloy purity and increased passivity. A suitable passive range for long term use (e.g. greater than 20 years) in solar panel applications (using normal heat extraction fluids, such as 50% water/50% propylene glycol) is assumed to be about 280 mV (as shown by line 80) or higher. This is not an exact limit, but an estimate based on LPE data and past service experience with conventional alloys. Such passive range levels correspond generally to aluminum alloys having contents of alloying elements of about 0.5 wt. % or less (i.e. no more than 0.5 wt. %), more preferably about 0.4 wt. % or less (i.e. no more than 0.4 wt. %), and most preferably about 0.35 wt. % or less (i.e. no more than 0.35 wt. %). The correlation between metal purity and passive range may not be exact because the time at which an alloy was cast and the way in which it was cast can result in variations in the levels of impurities which are bound in solid solution rather than being present in discrete inter-metallic phases. Thus, the thermo-mechanical processing history may affect an alloy's passivity even though the primary influence on passivity is the level of impurities. Nevertheless, the maximum figure of 0.5 wt. % for impurities for effective corrosion resistance is appropriate in most cases.

Table 3 below shows the results of LPE experiments conducted on the alloy Samples using the test solution (see above) having a higher level of chloride than standard ASTM water. This second test solution is regarded as being more aggressive than ASTM water. In the experiments, the solution was made even more aggressive by heating the solutions to about 85° C., which approximates the working temperature of thermal absorber devices.

TABLE 3

| Sample No. | Efc mV vs Ag/AgCl | Epit mV vs Ag/AgCl | Passive Range mV vs Ag/AgCl |
|---|---|---|---|
| 1 | −1168 | −591 | 577 |
| 2 | −1030 | −495 | 535 |
| 3 | −929 | −477 | 452 |
| 4 | −789 | −282 | 507 |
| 5 | −960 | −472 | 488 |
| 6 | −715 | Active Dissolution | N/A |
| 7 | −779 | Active Dissolution | N/A |
| 8 | −651 | Active Dissolution | N/A |

The data in Table 3 follows the same pattern as that previously described for Table 2 and FIG. 8. As with the results obtained for ASTM water, the purer alloys exhibit a greater passive range. The only notable difference from the earlier data is the active dissolution of the alloy of Sample 6 (an alloy with a slightly higher Fe content of 0.35 wt. %), as well as the conventional alloys of Samples 7 and 8. Consequently, these alloys exhibited no measurable passive range in this more aggressive test solution. These results show the need for purer alloys for clad layers in solar absorber applications. While the alloy of Sample 6 was found unsuitable in this test, and may indicate that it is less suitable than the alloys of Samples 1 to 5, it may still be suitable for use in practice because working conditions would not generally be as harsh. It is nevertheless preferred in general to keep the Fe content of an alloy exposed in use to heat extraction fluids (and even to the atmosphere within a solar unit) at no more than 0.25 wt. % (i.e. 0-0.25 wt. %) for most applications.

What is claimed is:

1. A solar energy absorber unit, comprising:
   a collector plate made of a heat-conductive material having a front surface adapted to absorb solar energy and to convert the solar energy to heat, and a rear surface opposite to the front surface;
   a rear panel having an inner surface and an outer surface, said inner surface being attached to areas of said rear surface of the collector plate via a fluid-tight bond, whereby said inner surface of said rear panel and said rear surface of said collector plate together define at least one fluid-conveying channel between said areas of said rear surface of the collector plate where said rear panel is attached thereto; and
   connectors for introducing a heat extraction fluid into said at least one fluid-conveying channel and for removing said fluid therefrom;
   wherein said collector plate comprises a core layer of an aluminum alloy provided with a cladding layer forming said rear surface of the collector plate and an additional cladding layer forming the front surface of the collector plate, wherein the solar energy absorber unit further comprises a layer of material disposed on the additional cladding layer and adapted to enhance the absorption of said solar energy, and wherein said cladding layers are made of aluminum or an aluminum alloy having a total content of alloying elements and impurities, if any, of no more than 0.5 wt. %.

2. The unit of claim 1, wherein said cladding layers are made of an aluminum alloy having a total content of alloying elements and impurities, if any, of no more than 0.4 wt. %.

3. The unit of claim 1, wherein said cladding layers are made of an aluminum alloy having a total content of alloying elements and impurities, if any, of no more than 0.35 wt. %.

4. The unit of claim 1, wherein said cladding layers have a content of Fe, if any, of no more than 0.25 wt. %.

5. The unit of claim 1, wherein said rear panel is made of a core layer of an aluminum alloy provided with a cladding layer forming said inner surface of the rear panel, said cladding layer of the rear panel being made of aluminum or an aluminum alloy having a total content of alloying elements and impurities, if any, of no more than 0.5 wt. %.

6. The unit of claim 5, wherein said cladding layer of the rear panel is made of an aluminum alloy having a total content of alloying elements and impurities, if any, of no more than 0.4 wt. %.

7. The unit of claim 5, wherein said cladding layer of the rear panel is made of an aluminum alloy having a total content of alloying elements and impurities, if any, of no more than 0.35 wt. %.

8. The unit of claim 5, wherein said cladding layer of the rear panel is made of an aluminum alloy having a content of Fe, if any, of no more than 0.25 wt. %.

9. The unit of claim 5, wherein said fluid-tight bond is a bond resulting from roll bonding together said cladding layers of the collector plate and the rear panel in said areas of said collector plate.

10. The unit of claim 9, wherein said at least one fluid-conveying channel is a structure resulting from fluid inflation of said rear panel, said collector plate, or both said rear panel and said collector plate between said areas of said collector plate carried out after formation of said fluid-tight bond.

11. The unit of claim 5, wherein said rear panel comprises a further cladding layer on an opposite side of said core layer of the rear panel forming said outer surface, said further cladding layer being made of aluminum or an aluminum alloy having a total content of alloying elements and impurities, if any, of no more than 0.5 wt. %.

12. The unit of claim 5, wherein said core layer of the rear panel is made of an aluminum alloy selected from the group consisting of alloys of the AA1XXX, AA3XXX, AA4XXX, AA5XXX and AA8XXX series.

13. The unit of claim 12, wherein said aluminum alloy is a non-heat-treatable alloy.

14. The unit of claim 5, wherein said core layer of the rear panel is made of an aluminum alloy having a yield strength of no more than about 60 MPa and a uniaxial elongation to failure of 30% or more.

15. The unit of claim 1, wherein said rear panel is made of a material selected from the group consisting of plastics materials and composite materials.

16. The unit of claim 15, wherein said fluid-tight bond is a bond resulting from application of an adhesive between said collector plate and said rear panel in said areas of said collector plate.

17. The unit of claim 1, wherein the additional cladding layer of the collector plate has a roughened or textured surface adapted to enhance the absorption of said solar energy.

18. The unit of claim 1, wherein the layer of material is a thin film formulated to have high absorptivity and low emissivity.

19. The unit of claim 1, wherein said core layer of the collector plate is made of an aluminum alloy selected from the group consisting of alloys of the AA1XXX, AA3XXX, AA4XXX, AA5XXX and AA8XXX series.

20. The unit of claim 19, wherein said aluminum alloy is a non-heat-treatable alloy.

21. A solar energy absorber device, comprising an enclosure having a front wall made of transparent material, and a solar energy absorber unit mounted within said enclosure, wherein the solar energy absorber unit comprises:
 a collector plate made of a heat-conductive material having a front surface adapted to absorb solar energy and to convert the solar energy to heat, and a rear surface opposite to the front surface;
 a rear panel having an inner surface and an outer surface, said inner surface being attached to areas of said rear surface of the collector plate via a fluid-tight bond,
 whereby said inner surface of said rear panel and said rear surface of said collector plate together define at least one fluid-conveying channel between said areas of said rear surface of the collector plate where said rear panel is attached thereto; and
 connectors for introducing a heat extraction fluid into said at least one fluid-conveying channel and for removing said fluid therefrom;
 wherein said collector plate comprises a core layer of an aluminum alloy provided with a cladding layer forming said rear surface of the collector plate and an additional cladding layer forming the front surface of the collector plate, wherein the solar energy absorber unit further comprises a layer of material disposed on the additional cladding layer and adapted to enhance the absorption of said solar energy and wherein said cladding layers are made of aluminum or an aluminum alloy having a total content of alloying elements and impurities, if any, of no more than 0.5 wt. %.

* * * * *